(12) United States Patent
Seymour et al.

(10) Patent No.: US 8,498,778 B2
(45) Date of Patent: Jul. 30, 2013

(54) NAVIGATION SYSTEM CONTROLLED TURN SIGNALS

(75) Inventors: Shafer Seymour, Bartlett, IL (US); Robert Gee, Lake Barrington, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 210 days.

(21) Appl. No.: 13/091,905

(22) Filed: Apr. 21, 2011

(65) Prior Publication Data

US 2012/0271510 A1 Oct. 25, 2012

(51) Int. Cl.
*G06F 7/00* (2006.01)

(52) U.S. Cl.
USPC ............. 701/36; 430/431; 430/435; 430/464; 430/468; 430/472; 211/85.8; 211/175; 211/190; 414/400; 414/572; 414/809; 220/203.26; 220/295; 220/300; 220/303; 220/304; 307/9.1; 307/10.1; 362/503

(58) Field of Classification Search
USPC ............ 701/36; 211/85.8, 175, 190; 414/400, 414/572, 809; 220/16, 18, 203.26, 295, 300, 220/303, 304; 340/431, 435, 464, 468, 472, 340/475, 476, 477, 479, 539.1, 990, 905, 340/995.2; 307/9.1, 10.1; 362/503
See application file for complete search history.

(56) References Cited

U.S. PATENT DOCUMENTS

| | | | |
|---|---|---|---|
| 6,269,304 B1 * | 7/2001 | Kaji et al. | 701/533 |
| 6,693,535 B2 | 2/2004 | Van Bosch et al. | |
| 6,873,898 B1 | 3/2005 | Kostadina | |
| 6,972,675 B2 | 12/2005 | Mills et al. | |
| 7,134,707 B2 | 11/2006 | Isaac | |
| 7,233,311 B2 | 6/2007 | Okubo et al. | |
| 7,292,152 B2 | 11/2007 | Torkkola et al. | |
| 7,561,966 B2 * | 7/2009 | Nakamura et al. | 701/438 |
| 7,747,385 B2 * | 6/2010 | Takashima | 701/446 |
| 8,190,363 B2 * | 5/2012 | Tomita et al. | 701/424 |
| 8,275,542 B2 * | 9/2012 | Adachi et al. | 701/400 |
| 2009/0069977 A1 | 3/2009 | Markyvech | |

(Continued)

FOREIGN PATENT DOCUMENTS

BR PI0604171 5/2008
DE 10251357 A1 5/2004

(Continued)

OTHER PUBLICATIONS

Partial International Search dated Jul. 5, 2012, from corresponding International Patent Application No. PCT/US2012/029741.

(Continued)

*Primary Examiner* — James Trammell
*Assistant Examiner* — McDieunel Marc

(57) ABSTRACT

A turn signal control system for use with a right turn signal and a left turn signal of a motor vehicle and a vehicle navigation system is provided. The turn signal system includes a processor configured to be operably coupled to the vehicle navigation system. The processor is configured to receive map data and route data from the vehicle navigation system. The processor is configured to determine a turn zone of the vehicle based on a set of criteria. A turn signal controller is operably coupled to the processor and configured to activate one of the right and left turn signals when the vehicle is in the turn zone. A method of controlling a right and left turn signal is also provided.

23 Claims, 3 Drawing Sheets

U.S. PATENT DOCUMENTS

| | | |
|---|---|---|
| 2009/0306891 A1 | 12/2009 | Jeon et al. |
| 2010/0049437 A1 | 2/2010 | Hu et al. |
| 2010/0052982 A1 | 3/2010 | Hu et al. |
| 2010/0165899 A1 | 7/2010 | Van Bosch et al. |
| 2010/0241605 A1 | 9/2010 | Groitzsch et al. |
| 2010/0265325 A1 | 10/2010 | Lo et al. |
| 2010/0280713 A1 | 11/2010 | Stahlin et al. |

FOREIGN PATENT DOCUMENTS

| | | |
|---|---|---|
| DE | 10355807 A1 | 7/2004 |
| DE | 102009004102 | 7/2010 |
| EP | 1347268 A1 | 9/2003 |
| EP | 1895274 A1 | 3/2008 |
| JP | 11342808 | 12/1999 |
| JP | 2007283933 A | 11/2007 |
| KR | 20030073002 | 9/2003 |
| KR | 20040042112 | 5/2004 |
| KR | 20060089377 | 8/2006 |
| KR | 20070099931 | 10/2007 |
| KR | 20070099932 A | 10/2007 |
| KR | 20100047531 | 5/2010 |
| TW | 201012674 | 4/2010 |
| TW | 201012676 | 4/2010 |

OTHER PUBLICATIONS

International Search Report and Written Opinion dated Oct. 16, 2012, from corresponding International Patent Application No. PCT/US2012/029741.

* cited by examiner

NAVIGATION SYSTEM CONTROLLED TURN SIGNALS

FIELD OF THE INVENTION

This invention generally relates to motor vehicle systems and methods for controlling turn signals of a motor vehicle.

BACKGROUND

Modern vehicles typically include a variety of safety systems to minimize or prevent injury to occupants of the vehicle. Safety systems may include, for example, air bags, seatbelts, antilock brakes, and traction control. These safety systems and others can be active or passive.

Some vehicle systems typically still rely on a driver to activate them, which can lead to error or mistake. For example, turn signals are typically activated by a driver when the driver is turning or changing lanes. However, it is not uncommon for a driver to fail to activate a turn signal at the appropriate time, thereby decreasing safety for the vehicle occupants and other vehicles on the road, as well as possibly violating laws requiring use of turn signals. Therefore, there exists a need for a system that overcomes such drawbacks.

SUMMARY

The system utilizes navigation system capability to use route and map data, or other vehicle data, in combination with driver actions to automatically activate turn signals. Available data from various sources is used to enhance vehicle safety by activating turn signal indicators and/or hazard warning lights automatically if the driver has not already activated them manually. The system may be configured to look at the context of the turn or lane change and makes an intelligent decision as to when to activate the turn signal(s).

A turn signal control system for use with a right turn signal and a left turn signal of a motor vehicle and a vehicle navigation system is provided. The turn signal system includes a processor configured to be operably coupled to the vehicle navigation system. The processor is configured to receive map data and route data from the vehicle navigation system, wherein the map data includes positions of side roads. The processor is configured to determine a turn zone of the vehicle based on a set of criteria. The set of criteria includes the route data and the map data. A turn signal controller is operably coupled to the processor and configured to activate one of the right and left turn signals when the vehicle is in the turn zone.

In some implementations, a turn signal control system for use with a right turn signal and a left turn signal of a first motor vehicle and a vehicle navigation system is provided that receives data from a variety of sources. The system includes a processor configured to be operably coupled to the vehicle navigation system, a vehicle speed data gatherer, a dynamic data gatherer, and an image-gathering device. The processor is configured to receive map data and route data from the vehicle navigation system, wherein the map data includes positions of side roads. Further, the processor is configured to receive speed data from the speed data gatherer, general traffic information from the dynamic data gatherer, and visible traffic information from the image-collecting device. The processor is configured to determine the proximity of a second vehicle to the first vehicle, the second vehicle being located behind the first vehicle. The processor is also configured to determine a turn zone of the vehicle based on a set of criteria. The set of criteria includes the route data and the map data, including the positions of side roads, the speed data, the general traffic information, the visible traffic information, and the proximity of the second vehicle to the first vehicle. A turn signal controller is operably coupled to the processor and configured to activate one of the right and left turn signals when the first vehicle is in the turn zone.

The turn zone may be defined as a position in which the first vehicle is approaching a turn. The turn zone has a first predetermined length when the side roads are closer to each other than a predetermined threshold distance, and the turn zone has a second predetermined length when the side roads are farther apart than the predetermined threshold distance. The first and second predetermined lengths are unequal. In other words, the turn zone is the zone for which one of the turn signals is activated. The turn zone does not always have the same length—in this embodiment, the turn zone depends on where the side roads are in comparison to each other. Thus, the turn zone may be longer, thus activating the turn signal sooner when the side roads are a certain distance apart, and the turn zone may be shorter when the side roads are another distance apart. In some embodiments, when the side roads are closest together, the turn zone is longer. If there is more space between side roads, the turn zone could be shorter to allow the vehicle to pass one side road before activating the turn signal, to avoid confusion that the vehicle will turn on the first side road. In other embodiments, the turn zone could be longest where there are no side roads other than the side road on which the vehicle will turn.

In some implementations, the present disclosure provides a turn signal control system for use with a right turn signal and a left turn signal of a motor vehicle, a vehicle navigation system, and a dynamic data gatherer. The turn signal control system includes a processor configured to be operably coupled to the vehicle navigation system and the dynamic data gatherer. The processor is configured to receive map data and route data from the vehicle navigation system and traffic information from the dynamic data gatherer. The processor is configured to determine a turn zone of the vehicle based on a set of criteria. The set of criteria includes the route data, the map data, and the traffic data. A turn signal controller is operably coupled to the processor and configured to activate one of the right and left turn signals when the vehicle is in the turn zone.

In some implementations, a safety-enhancing control system for controlling a right turn signal and a left turn signal of a motor vehicle is provided. The control system includes a vehicle navigation system, a processor, a turn signal controller, and right and left turn signals. The processor is operably coupled to the vehicle navigation system. The vehicle navigation system is configured to provide map data and route data to the processor, wherein the map data includes positions of side roads. The processor is configured to determine a turn zone of the vehicle based on a set of criteria. The set of criteria includes the route data and the map data, including the positions of side roads. The turn signal controller is operably coupled to the processor. The right and left turn signals are operably coupled to the turn signal controller. The turn signal controller is configured to activate one of the right and left turn signals when the vehicle is in the turn zone.

In some implementations, a method of controlling a right turn signal and a left turn signal of a motor vehicle including the use of a vehicle navigation system is provided. The method includes receiving map data and route data from a vehicle navigation system, wherein the map data includes positions of side roads. The method further includes determining a turn zone of the vehicle based on a set of criteria. The set of criteria includes the route data and the map data. The method also includes activating one of the right and left turn signals when the vehicle is in the turn zone.

In some implementations, a machine-readable medium that provides instructions is provided, which when executed by a machine, cause the machine to perform operations. The operations include receiving map data and route data from a vehicle navigation system, determining a turn zone of the vehicle based on a set of criteria, and activating one of the right and left turn signals when the vehicle is in the turn zone. The map data includes positions of side roads. The set of criteria includes the route data and the map data, including the positions of side roads.

In some implementations, an emergency signal control system for use with a right turn signal and a left turn signal of a motor vehicle and a vehicle navigation system is provided. The emergency signal control system includes a processor configured to be operably coupled to the vehicle navigation system. The processor is configured to receive map data from the vehicle navigation system and to determine an emergency zone of the vehicle based on a set of criteria. The set of criteria includes the map data. The emergency zone is determined when the vehicle is located in a stationary position directly adjacent to a road. An emergency signal controller is operably coupled to the processor and is configured to activate both of the right and left turn signals when the vehicle is in the emergency zone.

Further objects, features, and advantages of the present system, apparatus, and methods will become apparent from consideration of the following description and the appended claims when taken in connection with the accompanying drawings. It should be understood that the description and specific examples are intended for purposes of illustration only and are not intended to limit the scope of the present disclosure.

BRIEF DESCRIPTION OF THE DRAWINGS

Example embodiments of the invention are reflected in the drawings and will be described below. The drawings described herein are for illustration purposes only and are not intended to limit the scope of the present disclosure in any way. The drawings show.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple," "couples," "coupled," or "coupleable" are intended to mean either an indirect or direct electrical or wireless connection. Thus, if a first device couples to a second device, that connection may be through a direct electrical, optical, wireless connection, etc., or through an indirect electrical, optical, wireless connection, etc. by means of other devices and connections.

One or more embodiments of the invention are described below. It should be noted that these and other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1A:
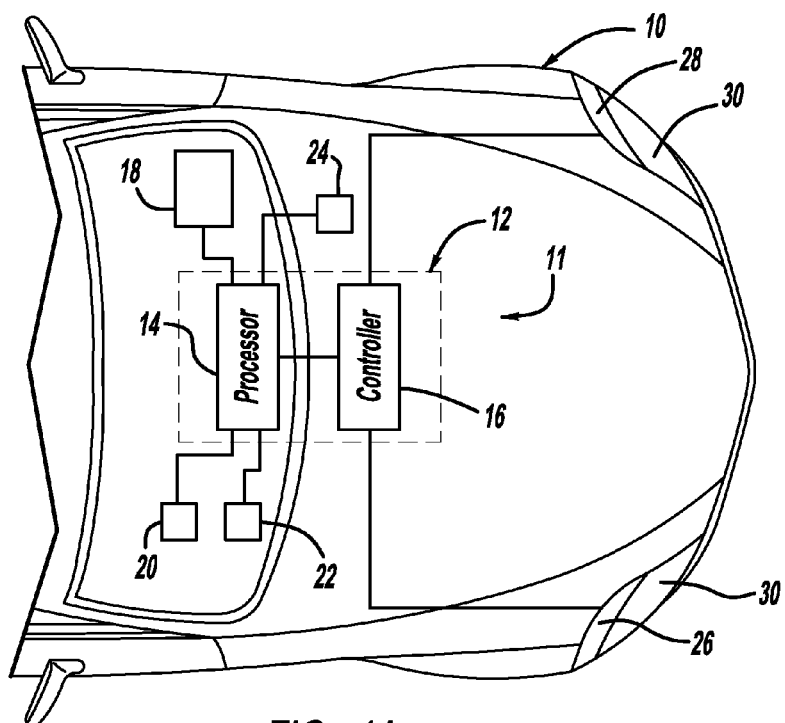
FIG. 1A is a top view of a representative motor vehicle.

A portion of a representative motor vehicle 10 is shown in FIG. 1A, including a safety-enhancing control system 11, which includes turn signal control system 12. The turn signal control system 12 includes a processor 14 operably coupled to a turn signal controller 16. The processor 14 may receive data from a vehicle navigation system 18 and a variety of other vehicle-related sensors 20, 22, 24, which will be described in more detail below. The turn signal controller 16 is operably coupled to the right turn signal 26 and the left turn signal 28. Although the right and left turn signals 26, 28 are shown as being located near the vehicle headlights 30, it should be understood that the turn signals 26, 28 also have components that are visible from the rear of the vehicle, such as near the taillights (not shown). Further, the turn signals 26, 28 need not be located near the headlights 30 or taillights; in some vehicles, turn signal lamps are located on the mirrors or on the rear window, by way of example. Thus, "turn signals" 26, 28 are used herein may refer to turn signals located anywhere within or on a vehicle and are not limited to a particular embodiment.

Figure 1B:
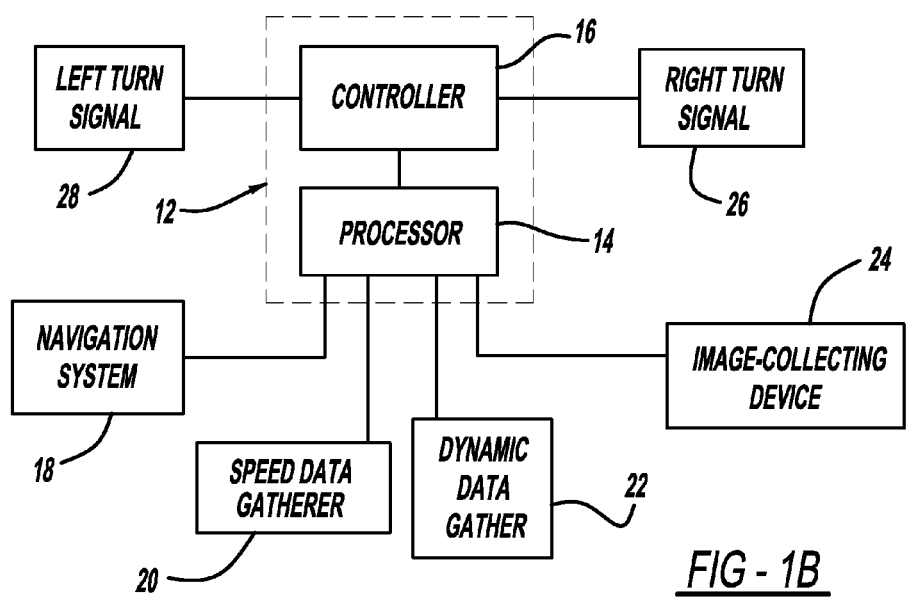
FIG. 1B is a schematic diagram of a safety-enhancing control system, including a turn signal control system.

Now with reference to FIG. 1B, a schematic representation of the safety-enhancing control system 11 including the turn signal control system 12 is illustrated. As stated above, the turn signal control system 12 includes a processor 14 and a turn signal controller 16. The processor 14 and turn signal controller 16 may be separate devices, or they may be located in a single control unit, if desired. The processor 14 is configured to be operably coupled to the vehicle navigation system 18, which may be a global positioning system (GPS). The processor 14 is configured to receive map data and route data from the vehicle navigation system 18. The map data includes the positions of side roads. The map data that includes the positions of the side roads may be sufficient to determine distances between any side roads that intersect the road on which the vehicle 10 is traveling, which will be explained in more detail below.

The processor 14 uses a set of criteria to determine when the vehicle 10 is in a turn zone. The turn zone may be defined as a position in which the vehicle 10 is approaching a turn. In one embodiment, the set of criteria includes the map and route data, including the positions of the side roads. In some implementations, the map data may include the distances between the side roads. The processor 14 is operably coupled to the turn signal controller 16. The turn signal controller 16 is operably coupled to the right and left turn signals 26, 28 as explained above. When the vehicle 10 is in a turn zone, as determined by the processor 14, the turn signal controller 16 automatically activates one of the right and left turn signals 26, 28 if the driver has not already done so. The processor 14 determines whether the vehicle 10 is in a right turn zone or a left turn zone, and causes the turn signal controller 16 to activate the corresponding turn signal of the right and left turn signals 26, 28.

Further, the processor 14 may determine whether the vehicle will change lanes, in some embodiments, and will activate the right or left turn signals 26, 28 accordingly. In these embodiments, the turn zone may also include a position in which the vehicle 10 is approaching a lane change or suggested lane change. For example, if the vehicle 10 is traveling on a multi-lane highway, the processor 14 may determine from the map and route data that the vehicle 10 is on a multi-lane road and that a turn on the vehicle's route is approaching, based on a predetermined route entered into the vehicle navigation system 18, for example. The processor 14 may determine that a lane change will be necessary to execute an upcoming turn. As such, the processor 14 may determine that the vehicle 10 is in a turn zone and activate one of the right and left turn signals 26, 28 to indicate a lane change. In this example, the turn signal activation may also serve the purpose of reminding the driver that a lane change is needed.

In some embodiments, the processor 14 is operably coupled to additional vehicle sensors. For example, the processor 14 may be coupled to a vehicle speedometer 20 or other speed data gatherer, a dynamic data gatherer 22, and/or an image collecting device 24.

The processor 14 may be configured to receive speed data from the vehicle speedometer 20 or other instrument in the vehicle 10 that determines the vehicle's speed such as a vehicle speed controller, and the set of criteria for determining the vehicle turn zone may include the speed data. For example, the processor 14 may take into consideration the speed at which the vehicle 10 is traveling to determine an appropriate time to cause the turn signal controller 16 to activate one of the turn signals 26, 28. If the vehicle 10 is traveling slowly, for example, the processor 14 may wait longer to cause the turn signal controller 16 to activate a turn signal 26, 28 than it would in a situation in which the vehicle 10 is traveling fast. In some implementations, the speed data may be received from the navigation system 18. For example, the speed data gatherer 20 may be a part of the navigation system 18.

The processor 14 may be configured to receive dynamic data from one or more dynamic data gatherers 22, such as a traffic update module of a GPS. The dynamic data could include general traffic information, road closure information, hazard information, and/or weather information, by way of example. The dynamic data could be included in the set of criteria for determining when the vehicle 10 is in a turn zone. For example, the processor 14 may determine that there is too much traffic along a certain route, and it may cause the turn signal controller 16 to activate the turn signals 24, 26 to suggest another route. Similarly, the processor 14 may determine that a road is closed or there is an upcoming hazard, and the processor 14 may cause the turn signal controller 16 to activate the turn signals 26, 28 to suggest a route and/or lanes to avoid road closures and hazards. In some embodiments, the processor 14 may determine that the turn zone starts at an earlier point, or a greater distance ahead of a turn, if there is a great amount of traffic detected.

In one example, the vehicle 10 may be traveling along a multi-lane road and approaching a cliff. The processor 14 may cause the turn signal controller 16 to activate a turn signal 26, 28 to suggest that the vehicle 10 move toward an inside lane away from the cliff. In another example, adverse weather conditions could be detected and the turn signals 26, 28 could be activated earlier, e.g., at a greater distance from a turn, if visibility conditions are low.

The processor 14 may be configured to receive from the image-collecting device image 24, such as a camera, image information from outside the vehicle 10. The image information could include, for example, visibility information, visible traffic information, presence of obstacles, and presence of road signs. The set of criteria for determining the turn zone could include the image information. For example, if the camera or other image-collecting device 24 collected information from which the processor 14 determined that visibility is low, the processor 14 may cause the turn signal controller 16 to activate either of turn signals 26, 28 earlier in time and at a greater distance from a turn or lane change. If the processor 14 determined that traffic is heavy, the processor 14 may cause the turn signal controller 16 to activate the turn signals 26, 28 earlier for a lane change, to allow more time to merge into a lane, but later for a turn if the traffic is moving slowly, by way of example.

In another example, the processor 14 could determine, from the image data, that there is an obstacle in front of the vehicle 10 in the road. The processor 14 could then cause the turn signal controller 16 to activate the corresponding turn signals 26, 28 to navigate around the obstacle.

In one embodiment, the image-collecting device 24 may collect the image of a second vehicle located behind the vehicle 10. The processor 14 may be configured to receive image data including the image of the second vehicle located behind the first vehicle 10, and determine the proximity of the second vehicle to the vehicle 10. The processor 14 may use other data to aid in such determination, such as speed data, if desired. The set of criteria used by the processor 14 to determine the turn zone could include the proximity of the second vehicle to the vehicle 10. For example, if the second vehicle is following at a close distance, or "tail-gating" the vehicle 10, the processor 14 could be configured to cause the turn signal controller 16 to activate one of the turn signals 26, 28 at an earlier time, and thus at a greater distance from the turn, to allow the second vehicle more notice of a turn, and therefore, to increase safety.

In some embodiments, the processor 14 could be configured to determine whether the vehicle 10 is a turn-only lane, based on the route data, the map data, the image data, or any other input. When the vehicle 10 is in a turn-only lane, the turn signal controller 16 could be configured to activate one of the right and left turn signals 26, 28.

In some embodiments, many of the operations described herein could be combined to achieve an intelligent turn signal control system 12 that uses multiple inputs to determine the turn zone and to activate the appropriate turn signal 26, 28. For example, in one embodiment, the processor 14 could be configured to determine whether the vehicle 10 is in a right-turn-only lane and to determine whether an obstacle is located ahead of the vehicle 10 in the right-turn-only lane. The processor 14 could cause the turn signal controller 16 to activate the right turn signal 26 when the vehicle 10 in the in the right-turn-only lane unless the obstacle located ahead of the vehicle 10 has a predetermined size. If the obstacle has a large enough predetermined size, the processor 14 could cause the turn signal controller 16 to activate the left turn signal 28, indicating that the vehicle 10 will move around the obstacle to the left first. The system 12 could then activate the right turn signal 26 to indicate a right turn, after the vehicle has navigated around the obstacle.

Similarly, in embodiments that detect the vehicle 10 being in an exit-only lane, the processor 14 could be configured to determine whether an obstacle (of a predetermined size) lies ahead of the vehicle 10 in an exit-only lane. In cases where an obstacle lies ahead of the vehicle 10, the processor 14 could be configured to cause the turn signal controller 16 to activate the turn signal 26, 28 of the opposite direction to show that the vehicle 10 needs to navigate around the obstacle. For example, if the exit is closed, the system 12 will cause the turn signal 26, 28 that points back onto the expressway to be activated.

Figure 2A:
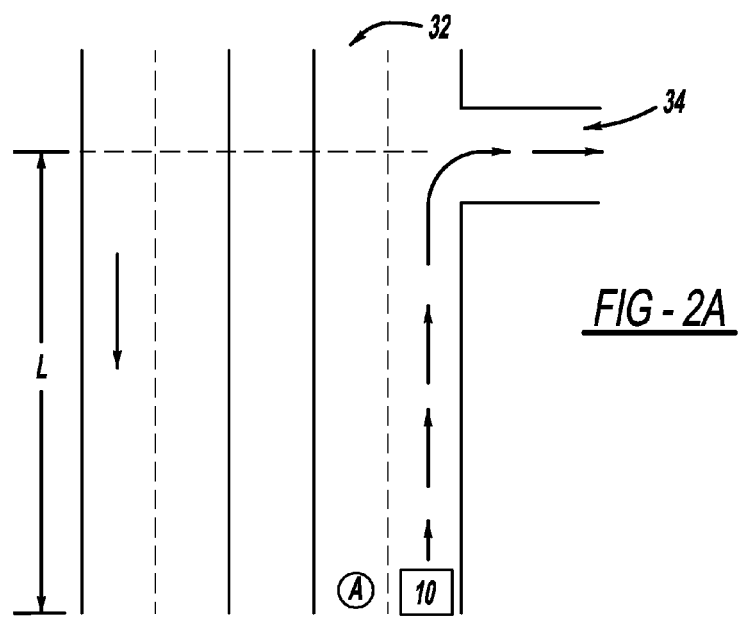
FIG. 2A is a schematic diagram of a multi-lane highway and a side road to illustrate the principles of the present system and method.
Figure 2B:
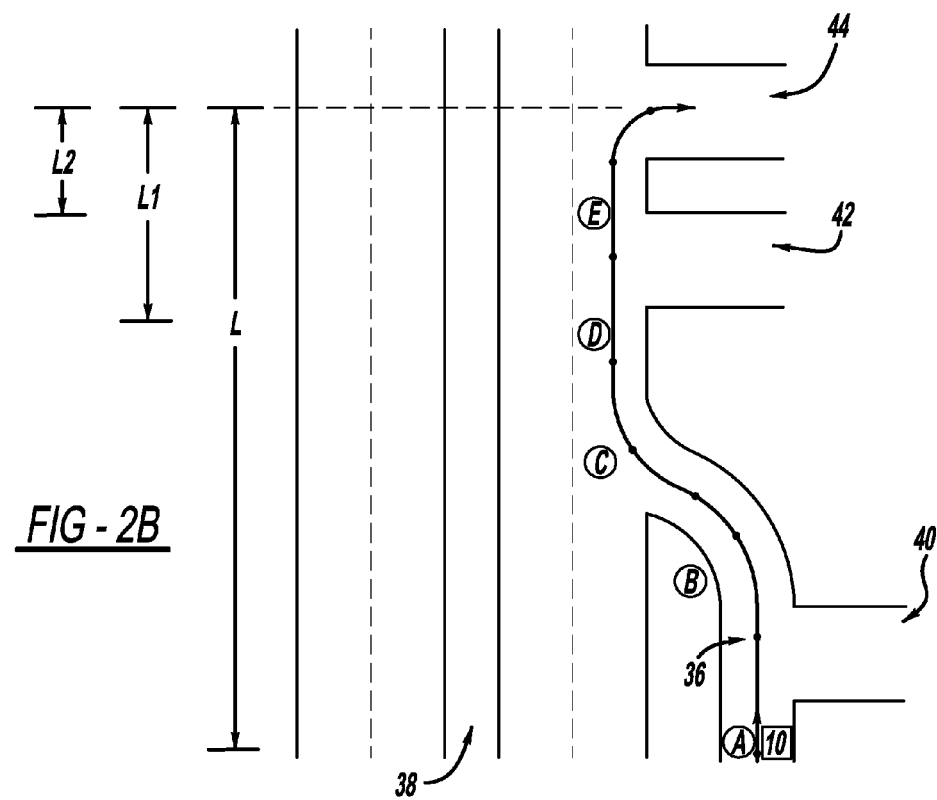
FIG. 2B is a schematic diagram of a multi-lane highway and several side roads to illustrate the principles of the present system and method.

Now with reference to FIGS. 2A and 2B, another aspect of the intelligent turn signal control system 12 is illustrated. In FIG. 2A, a four-lane highway 32 is illustrated. On the four-lane highway 32, a vehicle 10 may be moving at a high speed in a forward direction on the right side of the road as indicated by the arrow shown in FIG. 2A. The processor 14 may determine such information according to collected speed data and image data. The processor 14 may also determine that the vehicle 10 may turn onto the side road 34, based on route data received from the navigation system 18. Taking the route data, the speed data, and the image data into consideration, for example, or the route data alone in some embodiments, the processor 14 may determine that the vehicle 10 is in a turn zone at point A, even though point A is a considerable distance, or a fairly long distance L, from the side road 34. Thus, the turn signal controller 16 will activate the right turn signal 26 at point A to indicate that the vehicle will turn right on the side road 34.

In determining that the turn zone begins at point A in FIG. 2A, the processor 14 may take such factors into consideration such as: the vehicle 10 may be traveling at a high rate of speed, which may be over the speed limit, the route data shows that the vehicle 10 should turn right at side road 34, there are no other opportunities to turn onto other side roads before the side road 34, and/or there is a high probability or amount of traffic on multi-lane highway 32. Therefore, the processor 14 determines that the turn zone begins well in advance of the side road 34, and the turn signal controller 16 activates the turn signals 26, 28 well ahead of the side road 34 at which the turn will take place, such as at point A on the multi-lane highway 32. Such early activation allows traffic behind the vehicle 10 to back away from the vehicle 10 or change lanes before the vehicle 10 starts breaking for the turn at side road 34.

With reference to FIG. 2B, the vehicle 10 is traveling on a side road 36 that merges into a multi-lane highway 38. In this embodiment, the route data that the processor 14 receives from the vehicle navigation system 18 may indicate that the vehicle 10 needs to turn right onto the third side road shown at reference numeral 44. However, the map data received by the processor may show that there is a first side road 40 and second side road 42 located ahead of the vehicle 10 before the vehicle 10 will reach the third side road 44. Further, the map data may show that a left merge is required at point C before the vehicle 10 will reach the second and third side roads 42, 44. Therefore, even though the vehicle 10 may be located the same distance L as in FIG. 2A from the ultimate right turn, the processor 14 will not determine that the vehicle is in a right turn zone at point A in FIG. 2B because such a determination would be confusing in light of the first and second side roads 40, 42 and the left merge point C that is closer to the vehicle 10 than the third side road 44 upon which the vehicle 10 will ultimately turn. Accordingly, the processor 14 will not determine that the vehicle is in a right turn zone until the vehicle 10 reaches point D or E after the left merge.

Instead, the processor 14 will determine that the vehicle 10 is in a left turn zone at point A or B, to cause the turn signal controller 16 to activate the left turn signal 28, which indicates that the vehicle 10 will be merging left at point C. Once the vehicle 10 is on the multi-lane highway 38, the processor 14 could be configured to determine whether the right turn zone should be indicated at point D or E. For example, the processor 14 could receive the map data to determine the spacing between the side roads 42, 44; or in other words, data indicating how close the side roads 42, 44 are to each other. If the side roads 42, 44 are very close together, the processor 14 could be configured to determine that the right turn zone starts at point D. This is because there would be no time to start the turn zone after the side road 42 if the side roads 42, 44 are very close together. Thus, in this case, the processor 14 would cause the turn signal controller 16 to activate the right turn signal 26 at point D.

On the other hand, the processor 14 could determine from the map data that the side roads 42, 44 are not very close together, and in such case, the processor 14 could determine that the right turn zone begins at point E. Thus, in this case, the processor 14 would cause the turn signal controller 16 to activate the right turn signal 26 at point E. Thus, the right turn zone has a first predetermined length L1 when the side roads 42, 44 are closer to each other than a predetermined threshold distance and a second predetermined length L2 when the side roads 42, 44 are farther apart than the predetermined threshold distance. In some embodiments, the first and second predetermined lengths L1, L2 are unequal. In other embodiments, the first and second predetermined lengths L1, L2 may be equal or unequal, and they merely depend on the proximity of the side roads 42, 44.

In some embodiments, the first predetermined length L1 is longer than the second predetermined length L2, for example, in the embodiment described above. In other embodiments, the first predetermined length may be shorter than the second predetermined length.

In sum, FIGS. 2A and 2B illustrate that the processor 14 uses route and map data, including positions of side roads 40, 42, 44 and the intermediate left side merge at point C, to determine whether the vehicle 10 is in a right or left turn zone, and the processor 14 causes the turn signal controller 16 to activate the right and left turn signals 26, 28 accordingly.

Thus, in various embodiments, the processor 14 is configured to determine the turn zone of the vehicle 10 based on a set of criteria, and the set of criteria can include any number of types of data. For example, the set of criteria can include the route data and the map data, including the positions of side roads sufficient to determine the distance between side roads, the speed data, the general traffic information, the visible traffic information, and the proximity of the second vehicle to the vehicle, wherein the second vehicle is located behind the vehicle.

In some embodiments, both turn signals 26, 28 could be activated simultaneously, or other emergency signals could be activated by the turn signal control system 12 in the event that a driver does not activate hazard warning lights. For example, the processor 14 could determine that the vehicle has stopped on a road or on the side of a road, and the processor 14 could cause the turn signal controller 16 to activate both turn signals 26, 28 or other hazard lights.

It should be understood that the safety-enhancing control system 11 could include any combination or all of the environment sensors 18, 20, 22, 24 described above, or any other environment sensors not described herein in addition or in the alternative. Further, the environment sensors 18, 20, 22, 24 may be separate units, or some or all of them could be housed in a single sensor unit. For example, the navigation system 18 and dynamic data gatherer 22 may be part of a single apparatus.

Figure 3:
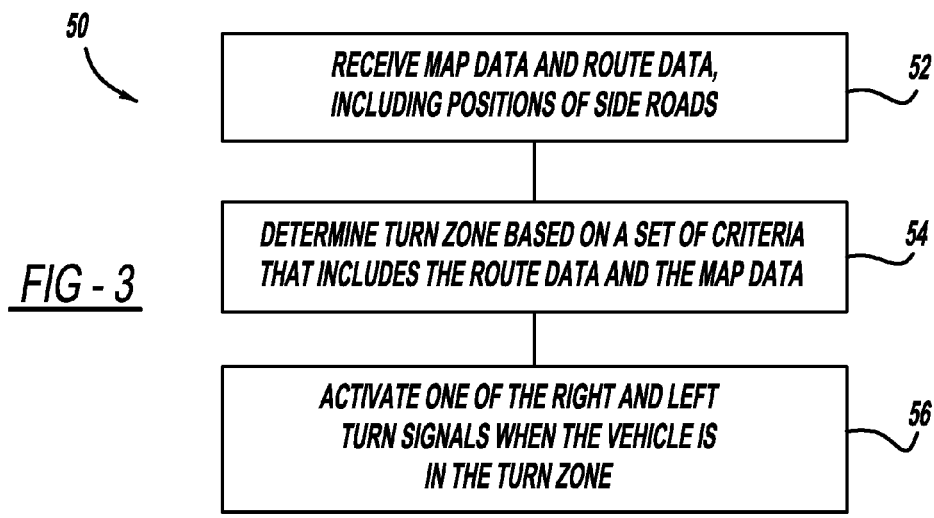
FIG. 3 is a process step diagram of a method for controlling a right turn signal and a left turn signal.

Now with reference to FIG. 3, a flow diagram is illustrated to show an example logic diagram for a method 50 that may be employed, for example, by the turn signal control system 12, to determine when to activate one of the turn signals 26, 28. In this example, the method 50 includes a step 52 of receiving map data and route data, including positions of side roads.

The method 50 further includes a step 54 of determining a turn zone based on a set of criteria that includes the route data and the map data, including the positions of the side roads and/or the distance between the side roads. In some embodiments, the set of criteria may also include determining the turn zone based on traffic data, image data, other dynamic data, speed data, and/or any other desired criteria. For example, in these embodiments, the method 50 further includes steps of receiving speed data from a vehicle speed data gatherer, receiving dynamic data from a dynamic data gatherer, and/or receiving image information from an image-collecting device. The dynamic data can include one or more of the following: general traffic information, road closure information, hazard information, and weather information. The image information can include one or more of the following: visibility information, visible traffic information, presence of obstacles, and presence of road signs. In some embodiments, the set of criteria can include the proximity of a second vehicle to the vehicle, wherein the second vehicle is located behind the vehicle.

The method 50 then includes a step 56 of activating one of the right and left turn signals 26, 28 when the vehicle 10 is in the determined turn zone.

In some embodiments, the method 50 includes determining whether the vehicle 10 is in a turn-only lane and activating one of the turn signals 26, 28 when the vehicle 10 is in the turn-only lane.

In addition to achieving compliance with the law and safety, the automatic activation of turn signals by the present invention may also alert the driver that the vehicle 10 is in a turn-only lane in the event that the driver did not realize that he/she was in a turn-only lane. Thus, in some embodiments, the processor 14 causes the turn signal controller 16 to activate a turn signal 26, 28 whenever the vehicle 10 is in a turn-only lane, regardless of whether the route data shows that the vehicle 10 will turn. This may be determined based on map data and/or image data. Similarly, in some embodiments, the turn signal control system 12 may automatically activate a turn signal 26, 28 when the vehicle 10 is an exit-only lane of an expressway, based on the map data and/or image data.

In some embodiments, the method 50 could include determining whether the vehicle 10 is in a right-turn-only lane and determining whether an obstacle is located ahead of the vehicle 10 in the right-turn only lane. The method 50 could then include activating the right turn signal 26 when the vehicle 10 is in the right-turn-only lane unless the obstacle has a predetermined size and is located ahead of the vehicle in the right-turn-only lane. The method 50 could include activating the left turn signal 28 if the obstacle has a predetermined size and is located ahead of the vehicle 10 in the right-turn-only lane.

In some embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the method 50, and any parts of the safety-enhancing control system 11 or the turn signal control system 12 described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Figure 4:
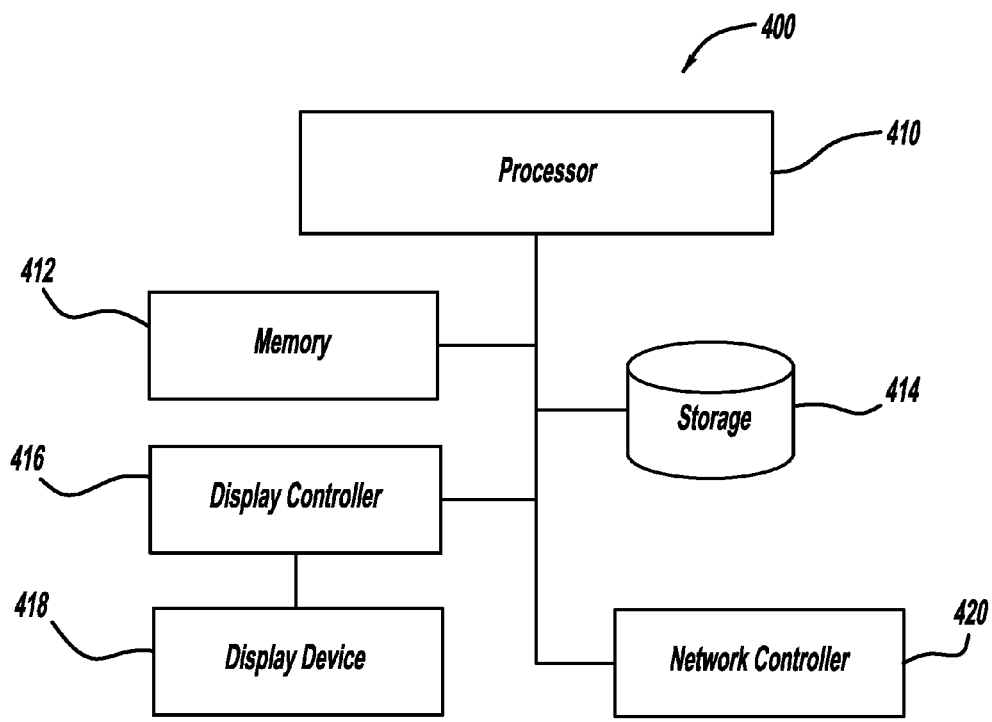
FIG. 4 is a schematic diagram of a computer system that may be used in implementing the present systems and methods.

For example, one or more computer systems may be used. One exemplary system is provided in FIG. 4. The computer system 400 includes a processor 410 for executing instructions such as those described in the methods discussed above. The instructions may be stored in a computer readable medium such as memory 412 or storage devices 414, for example a disk drive, CD, or DVD. The computer may include a display controller 416 responsive to instructions to generate a textual or graphical display on a display device 418, for example a computer monitor. In addition, the processor 410 may communicate with a network controller 420 to communicate data or instructions to other systems, for example other general computer systems. The network controller 420 may communicate over Ethernet or other known protocols to distribute processing or provide remote access to information over a variety of network topologies, including local area networks, wide area networks, the Internet, or other commonly used network topologies.

Embodiments of the present system and method may allow a driver to more easily comply with the law and enhance safety of traveling. In addition, activating turn signals automatically may result in an added benefit of reminding a driver that a turn or desired lane change is approaching and should be effected.

In some implementations, the turn control system 12 may be an emergency signal control system coupled to the right and left turn signals 26, 28 as shown in FIGS. 1-2. The processor 14, which is operably coupled to the vehicle navigation system 18, may be configured to receive map data from the vehicle navigation system 18, as explained above. The processor 18 may be configured to determine an emergency zone of the vehicle 10 based on a set of criteria. The set of criteria may include any of the criteria discussed above, such as the map data. In some implementations, the emergency zone may be determined when the map data shows that the vehicle 10 is located in a stationary position directly adjacent to a road. For example, if the processor 14 determines that the vehicle 10 is stopped alongside a road, the processor 14 may determine that the vehicle 10 is in the emergency zone. In such a case, the processor 14 may cause the turn signal controller 16, which may be an emergency signal controller, to activate both of the right and left turn signals 26, 28.

In addition, or in the alternative, the processor 14 may use the speed data gathered from the speed data gatherer 20 to determine when the vehicle 10 is in the emergency zone. The processor 14 may further receive posted speed limit data and/or posted speed minimum data from the vehicle navigation system 18. For example, the navigation system 18 may be able to collect data that tells the processor 14 the posted speed limit for a road on which the vehicle 10 is traveling. For some roads, such as controlled-entrance expressways, posted speed minimum data may also be available.

The processor 14 may determine that the vehicle 10 is in the emergency zone when the vehicle 10 is traveling a predetermined speed that is under the speed limit. The processor 14 may then cause the emergency signal controller 16 to activate both the right and left turn signals 26, 28 when the vehicle 10 is in the emergency zone.

For example, in some implementations, the predetermined speed may be set at 20 miles per hour below the posted speed limit. In other implementations, the predetermined speed may be set at 25 or 30 miles per hour below the posted speed limit. Thus, for example, where the posted speed limit is 65 miles per hour, the emergency zone may be determined if the vehicle is traveling at or below 40 miles per hour. These figures are examples and are not intended to limit the present disclosure.

In implementations wherein the processor 14 receives the posted speed minimum data, the processor 14 may determine that the vehicle 10 is in the emergency zone when the vehicle 10 is traveling at any speed below the posted minimum speed. Or, the processor 14 may be set to determine that the vehicle 10 is in the emergency zone when the vehicle 10 is traveling a predetermined speed below the posted minimum speed. For example, in some implementations, the processor 14 could be set to determine that the vehicle 10 is in the emergency zone when the vehicle 10 is traveling 1, 5 or 10 miles per hour below the post minimum speed, by way of example.

As a person skilled in the art will readily appreciate, the above description is meant as one illustration of the principles of the invention. This description is not intended to limit the scope or application of the invention in that the invention is susceptible to modification, variation and change, without departing from spirit of the invention, as defined in the following claims.

We claim:

1. A turn signal control system for use with a right turn signal and a left turn signal of a motor vehicle and a vehicle navigation system, the turn signal control system comprising:
a processor configured to be operably coupled to the vehicle navigation system, the processor configured to receive map data and route data from the vehicle navigation system, the map data including positions of side roads, the processor being configured to determine a turn zone of the vehicle based on a set of criteria, the set of criteria including the route data and the map data, wherein the turn zone is defined as a position in which the vehicle is approaching a turn, the turn zone having a first predetermined length when the side roads are closer to each other than a predetermined threshold distance, the turn zone having a second predetermined length when the side roads are farther apart than the predetermined threshold distance, the first and second predetermined lengths being unequal; and
a turn signal controller operably coupled to the processor and configured to activate one of the right and left turn signals when the vehicle is in the turn zone.

2. The turn signal control system of claim 1, the processor configured to be operably coupled to a vehicle speed data gatherer, the processor configured to receive speed data from the vehicle speed data gatherer, the set of criteria for determining the turn zone including the speed data.

3. The turn signal control system of claim 2, the processor configured to be operably coupled to a dynamic data gatherer, the processor configured to receive dynamic data including at least one of general traffic information, road closure information, hazard information, and weather information from the dynamic data gatherer, the set of criteria for determining the turn zone including the dynamic data.

4. The turn signal control system of claim 3, the processor configured to be operably coupled to an image-collecting device, the processor configured to receive image information related to images outside the vehicle from the image-collecting device, the image information including at least one of visibility information, visible traffic information, presence of obstacles, and presence of road signs, the set of criteria for determining the turn zone including the image information.

5. The turn signal control system of claim 1, wherein the first predetermined length is longer than the second predetermined length.

6. The turn signal control system of claim 1, the vehicle being a first vehicle, wherein the processor is configured to determine the proximity of a second vehicle to the first vehicle, the second vehicle being located behind the first vehicle, the set of criteria for determining the turn zone including the proximity of the second vehicle to the first vehicle.

7. A turn signal control system for use with a right turn signal and a left turn signal of a motor vehicle and a vehicle navigation system, the turn signal control system comprising:
a processor configured to be operably coupled to the vehicle navigation system, the processor configured to receive map data and route data from the vehicle navigation system, the map data including positions of side roads, the processor being configured to determine a turn zone of the vehicle based on a set of criteria, the set of criteria including the route data and the map data, wherein the processor is configured to determine whether the vehicle is in a turn-only lane; and
a turn signal controller operably coupled to the processor and configured to activate one of the right and left turn signals when the vehicle is in the turn zone, the turn signal controller being configured to activate one of the right and left turn signals when the vehicle is in the turn-only lane.

8. The turn signal control system of claim 6, wherein the processor is configured to determine whether the vehicle is in a right-turn-only lane, the processor being configured to determine whether an obstacle is located ahead of the vehicle in the right-turn-only lane, the turn signal controller being configured to activate the right turn signal when the vehicle is in the right-turn-only lane unless an obstacle having a predetermined size is located ahead of the vehicle in the right-turn-only lane, the turn signal controller being configured to activate the left turn signal when the obstacle having the predetermined size is located ahead of the vehicle in the right-turn-only lane.

9. A turn signal control system for use with a right turn signal and a left turn signal of a first motor vehicle and a vehicle navigation system, the turn signal control system comprising:
- a processor configured to be operably coupled to the vehicle navigation system, a vehicle speed data gatherer, a dynamic data gatherer, and an image-gathering device, the processor configured to receive map data and route data from the vehicle navigation system, the map data including positions of side roads, the processor configured to receive speed data from the speed data gatherer, the processor configured to receive general traffic information from the dynamic data gatherer, the processor configured to receive visible traffic information from the image-collecting device, and the processor configured to determine the proximity of a second vehicle to the first vehicle, the second vehicle being located behind the first vehicle, wherein the processor is configured to determine a turn zone of the vehicle based on a set of criteria, the set of criteria including the route data, the map data, the speed data, the general traffic information, the visible traffic information, and the proximity of the second vehicle to the first vehicle, wherein the turn zone is defined as a position in which the vehicle is approaching a turn or lane change, the turn zone having a first predetermined length when the side roads are closer to each other than a predetermined threshold distance, the turn zone having a second predetermined length when the side roads are farther apart than the predetermined threshold distance, the first and second predetermined lengths being unequal; and
- a turn signal controller operably coupled to the processor and configured to activate one of the right and left turn signals when the first vehicle is in the turn zone.

10. The turn signal control system of claim 9, wherein the processor is configured to determine whether the first vehicle is in a right-turn-only lane, the processor being configured to determine whether an obstacle is located ahead of the first vehicle in the right-turn-only lane, the turn signal controller being configured to activate the right turn signal when the first vehicle in the in the right-turn-only lane unless an obstacle having a predetermined size is located ahead of the first vehicle in the right-turn-only lane, the turn signal controller being configured to activate the left turn signal when the obstacle having the predetermined size is located ahead of the first vehicle in the right-turn-only lane.

11. A turn signal control system for use with a right turn signal and a left turn signal of a motor vehicle, a vehicle navigation system, and a dynamic data gatherer, the turn signal control system comprising:
- a processor configured to be operably coupled to the vehicle navigation system and the dynamic data gatherer, the processor being configured to receive map data and route data from the vehicle navigation system and traffic information from the dynamic data gatherer, the processor being configured to determine a turn zone of the vehicle based on a set of criteria, the set of criteria including the route data, the map data, and the traffic data, wherein the map data includes positions of side roads, wherein the turn zone is defined as a position in which the vehicle is approaching a turn or lane change, the turn zone having a first predetermined length when the side roads are closer to each other than a predetermined threshold distance, the turn zone having a second predetermined length when the side roads are farther apart than the predetermined threshold distance, the first and second predetermined lengths being unequal; and
- a turn signal controller operably coupled to the processor and configured to activate one of the right and left turn signals when the vehicle is in the turn zone.

12. The turn signal control system of claim 11, the processor configured to be operably coupled to a vehicle speed data gatherer, the processor configured to receive speed data from the vehicle speed data gatherer, the set of criteria for determining the turn zone including the speed data.

13. The turn signal control system of claim 12, the processor configured to be operably coupled to an image-collecting device, the processor configured to receive image information related to images outside of the vehicle from the image-collecting device, the image information including at least one of visibility information, visible traffic information, presence of obstacles, and presence of road signs, the set of criteria for determining the turn zone including the image information.

14. The turn signal control system of claim 13, wherein the vehicle is a first vehicle, and wherein the processor is configured to determine a proximity of a second vehicle to the first vehicle, the second vehicle being located behind the first vehicle, the set of criteria for determining the turn zone including the proximity of the second vehicle to the first vehicle.

15. The turn signal control system of claim 14, wherein the processor is configured to determine whether the first vehicle is in a right-turn-only lane, the processor being configured to determine whether an obstacle is located ahead of the first vehicle in the right-turn-only lane, the turn signal controller being configured to activate the right turn signal when the first vehicle is in the right-turn-only lane unless an obstacle having a predetermined size is located ahead of the first vehicle in the right-turn-only lane, the turn signal controller being configured to activate the left turn signal when the obstacle having the predetermined size is located ahead of the first vehicle in the right-turn-only lane.

16. A method of controlling a right turn signal and a left turn signal of a motor vehicle including the use of a vehicle navigation system, the method comprising:
- receiving map data and route data from a vehicle navigation system, the map data including positions of side roads;
- determining by a processor a turn zone of the vehicle based on a set of criteria, the set of criteria including the route data and the map data, wherein the turn zone is defined as a position in which the vehicle is approaching a turn or lane change, the turn zone having a first predetermined length when the side roads are closer to each other than a predetermined threshold distance, the turn zone having a second predetermined length when the side roads are farther apart than the predetermined threshold distance, the first and second predetermined lengths being unequal; and
- activating one of the right and left turn signals when the vehicle is in the turn zone.

17. The method of claim 16, further comprising:
- receiving speed data from a vehicle speed data gatherer;
- receiving dynamic data from a dynamic data gatherer, the dynamic data including at least one of general traffic information, road closure information, hazard information, and weather information;
- receiving image information from an image-collecting device, the image information including at least one of visibility information, visible traffic information, presence of obstacles, and presence of road signs; and
- the vehicle being a first vehicle, determining the proximity of a second vehicle to the first vehicle, the second vehicle being located behind the first vehicle, wherein the set of criteria for determining the turn zone includes the proximity of the second vehicle to the first vehicle, the image information, the dynamic data, and the speed data.

18. A method of controlling a right turn signal and a left turn signal of a motor vehicle including the use of a vehicle navigation system, the method comprising:
 receiving map data and route data from a vehicle navigation system, the map data including positions of side roads;
 determining by a processor a turn zone of the vehicle based on a set of criteria, the set of criteria including the route data and the map data; and
 activating one of the right and left turn signals when the vehicle is in the turn zone; and
 determining by the processor whether the vehicle is in a turn-only lane and activating one of the turn signals when the vehicle is in the turn-only lane.

19. The method of claim 18, further comprising:
 determining by the processor whether the vehicle is in a right-turn-only lane;
 determining by the processor whether an obstacle is located ahead of the vehicle in the right-turn-only lane and determining by the processor whether the obstacle is greater than or equal to a predetermined size;
 activating the right turn signal when the vehicle in the in the right-turn-only lane unless the obstacle is located ahead of the vehicle in the right-turn-only lane and is greater than or equal to a predetermined size; and
 activating the left turn signal when the obstacle is ahead of the vehicle in the right-turn-only lane and is greater than or equal to the predetermined size.

20. A non-transitory machine-readable medium that provides instructions, which when executed by a machine, cause the machine to perform operations comprising:
 receiving map data and route data from a vehicle navigation system, the map data including positions of side roads;
 determining a turn zone of the vehicle based on a set of criteria, the set of criteria including the route data and the map data, wherein the turn zone is defined as a position in which the vehicle is approaching a turn or lane change, the turn zone having a first predetermined length when the side roads are closer to each other than a predetermined threshold distance, the turn zone having a second predetermined length when the side roads are farther apart than the predetermined threshold distance, the first and second predetermined lengths being unequal; and
 activating one of the right and left turn signals when the vehicle is in the turn zone.

21. An emergency signal control system for use with a right turn signal and a left turn signal of a motor vehicle and a vehicle navigation system, the emergency signal control system comprising:
 a processor configured to be operably coupled to the vehicle navigation system, the processor configured to receive map data from the vehicle navigation system, the processor being configured to determine an emergency zone of the vehicle based on a set of criteria, the set of criteria including the map data, wherein the emergency zone is determined when the vehicle is located in a stationary position directly adjacent to a road; and
 an emergency signal controller operably coupled to the processor and configured to activate both of the right and left turn signals when the vehicle is in the emergency zone.

22. The emergency signal control system of claim 21, the processor configured to be operably coupled to a speed data gatherer, the processor configured to receive speed data from the speed data gatherer and to receive posted speed limit data from the navigation system, the set of criteria for determining the emergency zone including the speed data, wherein the emergency zone is determined when the vehicle is traveling a predetermined speed that is under the speed limit.

23. The emergency signal control system of claim 22, the processor configured to receive posted speed minimum data from the navigation, wherein the emergency zone is determined when the vehicle is traveling under the post speed minimum.

* * * * *